Sept. 8, 1942.  T. A. BAKER  2,295,251
ISOSTATIC FLUID DISTRIBUTION SYSTEM
Filed June 15, 1940  2 Sheets-Sheet 1

INVENTOR
THOMAS A. BAKER
By Stoodling and Krost
ATTORNEY

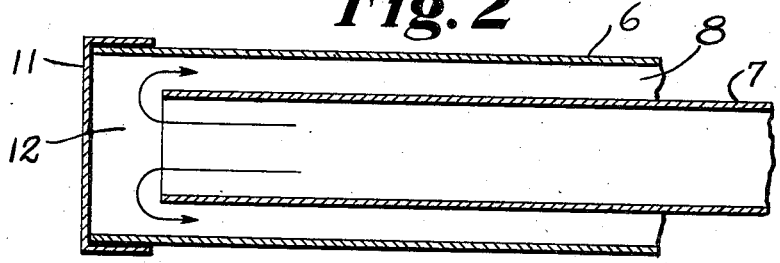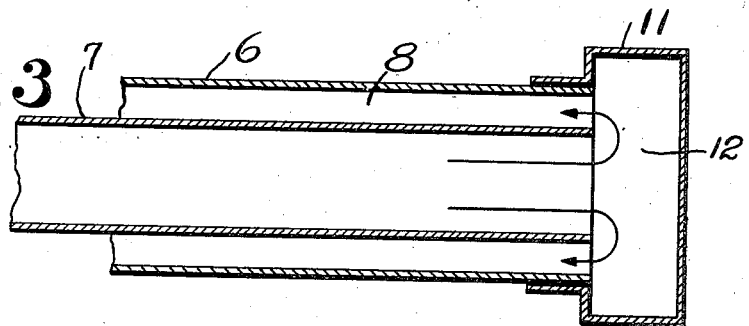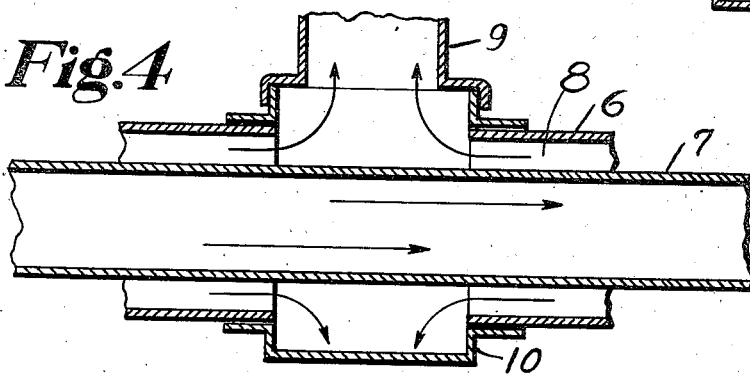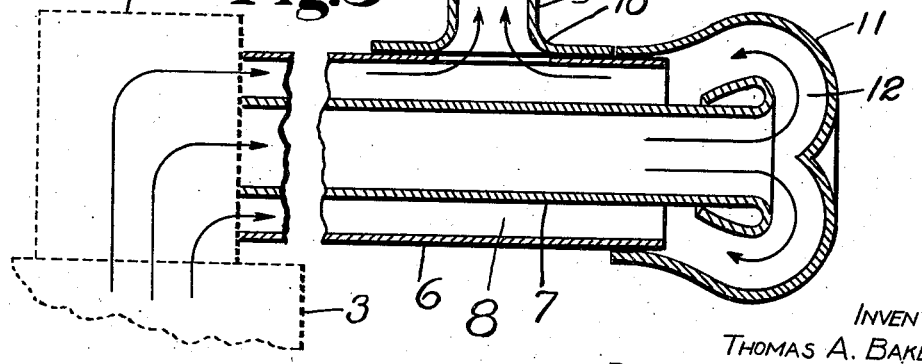

Patented Sept. 8, 1942

2,295,251

UNITED STATES PATENT OFFICE 2,295,251

ISOSTATIC FLUID DISTRIBUTION SYSTEM

Thomas A. Baker, Logansport, Ind.

Application June 15, 1940, Serial No. 340,851

2 Claims. (Cl. 98—33)

My invention relates to fluid distribution systems and to the methods of distribution of fluids, both gaseous and liquid, to produce an isostatic condition. It is particularly applicable to air distribution systems used in the heating, cooling, ventilating, etc., of dwelling houses, apartments, office buildings, industrial buildings, various spaces, and the like.

One purpose of my invention is to eliminate the difficulty previously experienced, in the design and installation of conventional distribution systems, of obtaining a properly balanced or equalized flow of air in the required quantities to all parts of the distribution system, particularly the branches and stacks leading to, or the outlets serving, remote parts of the building in which the installation is made. With the use of this system it becomes a simple matter to secure a well-balanced flow through all parts of the system, since distribution is accomplished under isostatic conditions throughout the length of the distributing mains, and delivery of air in desired quantities at each branch or outlet is assured. Difficulties previously experienced with conventional systems in selecting sizes for mains, branches, stacks, outlets, etc., for desired air quantities, is greatly lessened, due to the assurance of an adequate supply of air at the required head pressure at each branch.

Another purpose of my invention is the standardization of parts required for the installation of air distribution systems, so that a smaller variety of parts need be manufactured and warehoused by jobber or dealer.

Still another purpose of my invention is the improvement of air flow characteristics throughout the system. It will be clearly understood that the introduction of the pressure equalizing member or duct, hereinafter described, has a marked influence toward the reduction of turbulence in the air stream. The pressure equalizing member when located within the distributing pipe acts as a turning vane or air straightening member, thus causing air flow throughout the entire area of the distributing chamber with consequent betterment of performance.

A still further object of my invention is to provide a heating, cooling and/or ventilating system for a plurality of enclosures in which different conditions may be set for the various enclosures and the enclosures maintained at those conditions independently of each other.

Another object of my invention is to provide a heating, cooling and/or ventilating system for a plurality of enclosures in which no enclosure will rob the system of more than its share of the treated air to the exclusion of the other enclosures in the system.

A still further object of my invention is to provide a conditioning system having individual automatic dampening devices for the enclosures to be conditioned.

A still further object of my invention is to provide an air conditioning system in which the distribution system need not be designed to have substantially identical pressure head values at all outlets.

Still another object of my invention is to provide a system for delivering air to a plurality of enclosures in which the air delivered to each enclosure is automatically regulated by an independently adjustable device, and in which each device prevents its enclosure from robbing the system of too much conditioned air thereby protecting all of the other enclosures in the system.

A further object of my invention is to provide a system for distributing conditioned air to a plurality of enclosures and to regulate the flow of conditioned air in the system by a plurality of independently adjustable devices.

A still further object of my invention is to provide a heating, cooling, and/or ventilating system for a plurality of enclosures in which identical or different conditions may be set for the various enclosures and the enclosures maintained at those conditions independently of each other; this to be accomplished without requiring the employment of secondary or individual heat exchanger booster surfaces.

Other objects and a fuller understanding of my invention may be had by referring to the following description and claims, taken in conjunction with the accompanying drawings, in which:

Figures 2 and 3 are sectional representations of different modifications of deflecting chambers, Figure 3 being taken along the line 3—3 of Figure 1, and Figure 2 being a modification of Figure 3;

Figure 4 is a sectional representation of a portion of a distribution conductor showing one form of a take-off junction and taken along the line 4—4 of Figure 1; and Figure 5 shows a modified form of a take-off junction and another modification of a deflecting chamber.

Figure 1:
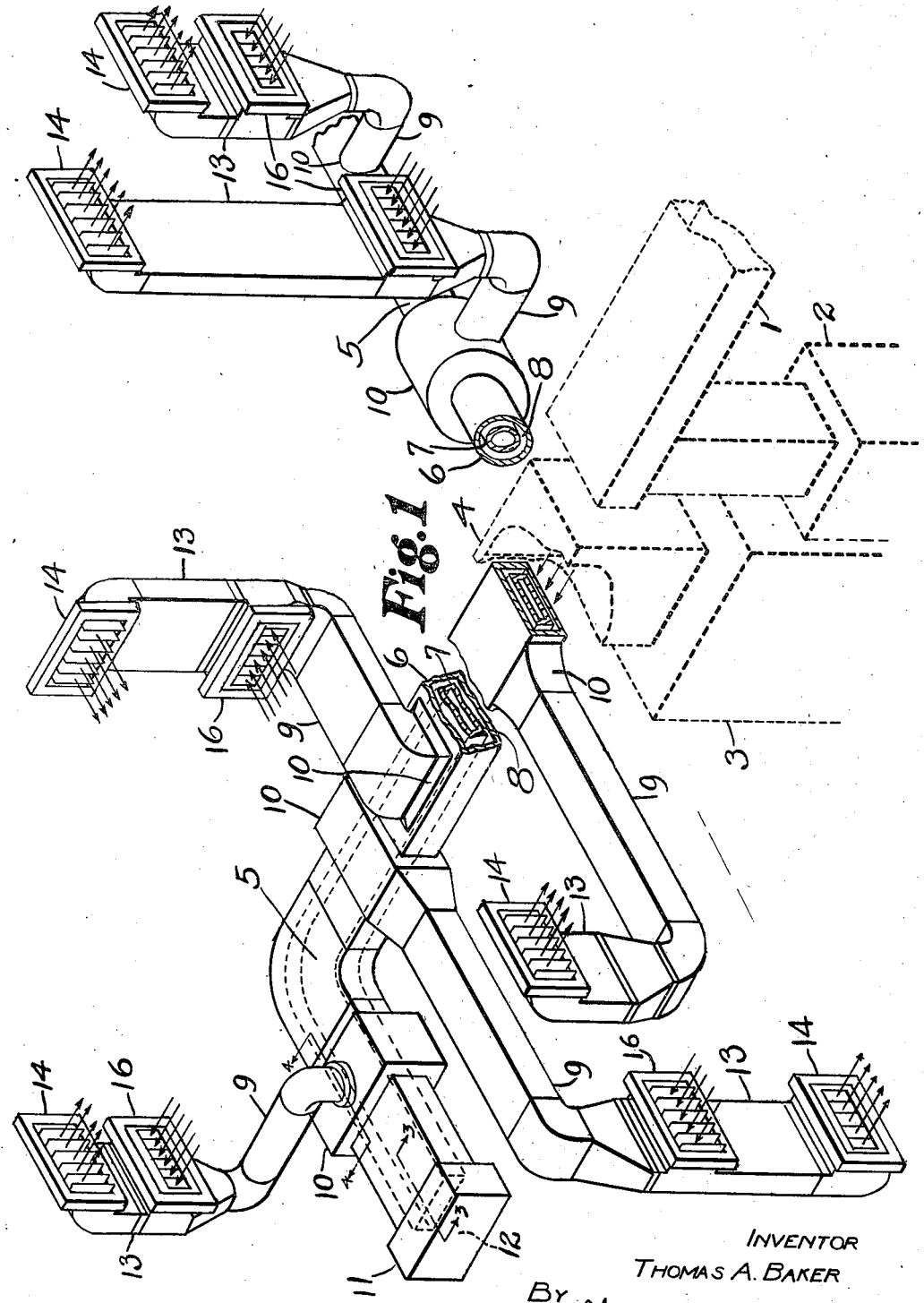
Figure 1 is a schematic representation of a typical installation, embodying features of my invention and showing various modifications of branches, stacks and other parts of the system.

The distributing system illustrated generally by the reference character 5 comprises, essentially, an outer distributing duct 6 within which is suitably held or mounted an inner pressure equalizing duct 7. This pressure equalizing duct is open at both ends to permit the flow of air therethrough, and is entirely without openings between its extremities, that is, it is of a continuous construction.

The inner duct functions as a pressure equalizing pipe since it has no lateral openings between its extremities; hence any head pressure existent at its inlet end is immediately available in a like head pressure at its terminating end. The space between the inner duct 7 and the outer duct 6 may be referred to as a distributing chamber and is identified by the reference character 8. Due to the fact that air is allowed to pass from the distributing chamber 8 into the branches, there exists a tendency for the head pressure to drop in this chamber. However, this tendency toward a drop in head pressure in the distributing chamber is offset with the result that an isostatic condition is produced, since air may flow in one or more directions to the point of low pressure from a point of higher pressure within the distributing chamber and/or the pressure equalizing duct.

In Figure 1, the reference characters 1, 2, 3 and 4 represent standard or desired heating, cooling, and/or ventilating equipment. The reference character 1 is the return air or blower air inlet connection; 2 is the blower; 3 is the heating or cooling source; and 4 is the plenum chamber.

In some cases air may be discharged directly from the blower 2 into the distribution system 5, or ducts 6 and 7, eliminating items 3 and/or 4. The inner duct 7 is held by any convenient means in any desired position within shell 6, so that air passing through the distribution system finds free passage through distributing chamber 8 as well as through the pressure equalizing duct 7. The cross-sectional area of the distributing chamber 8 and that of the pressure equalizing duct 7 may be substantially the same. It will be noted that the pressure equalizing pipe or duct 7 is somewhat foreshortened and bears such a length relationship to outer pipe or duct 6 that a deflecting chamber 12 is formed by the disposal of a terminating cap 11 as shown in Figures 1, 2, 3 and 5. The mounting of the equalizing duct 7 within the outer duct 6 has a marked influence toward the reduction of turbulence in the air stream. The equalizing duct 7 within the outer duct 6 functions as a turning vane or air straightening member and automatically produces ideal air flow conditions, as well as conserves space.

The distribution system 5 may be of any convenient shape, either rectangular, elliptical, round, or any other section, or a combination of any desirable shapes. The branches 9 may also be of any convenient section. The take-off junctions 10 may likewise be of any convenient form, as may the terminating caps 11, see the modification in Figure 5. The reference characters 14 represent register, grille, or outlet heads of standard or desired type. Vertical heads for horizontal delivery are shown, but heads of any type for any desired delivery may be used. The reference characters 16 represent an air regulating device, which is fully described in my application for Letters Patent entitled Fluid system and a regulating device therefor, Serial No. 340,852, filed June 15, 1940. My air regulating devices 16 are positioned within the rooms or enclosures and each is adapted to control the condition of the air within the room in which it is positioned.

The stacks 13 which are commonly concealed in the walls or floors, may be located in any convenient place, and may be of any desired form; rectangular, elliptical, round, etc. This distribution system may be used in connection with any energized air source, no modification whatever in the source being necessary. The outer shell or duct 6 is connected to the wall of the supply plenum chamber in the usual manner, ordinary care being taken that there is no obstruction to free flow of air into the inner pressure equalizing duct 7 or distributing chamber 8. Both rectangular and circular forms for the distribution system 5 are shown in the drawings; however, the form chosen is immaterial.

In operation, the air from the source, whether warm or cool, after having filled the system 5, flows in the distributing chamber 8 and through the take-off junctions 10 into the branches 9, whence it passes, through stacks 13 and heads 14 into the room or space being heated, cooled and/or ventilated as the case may be. Naturally, as air flows from the distributing chamber 8 there is a tendency toward a drop in the pressure head therein. Actually there is only a negligible drop in pressure, since air at higher or initial pressure in both the distributing chamber 8 and the pressure equalizing duct 7 is constantly available and will cause air to flow toward the area of lower pressure. Thus, air passing into the branches 9 will cause air to flow from the distributing chamber 8 through the take-off junctions 10. If a tendency exists for an unbalanced head condition, the air may flow from one or more directions into the take-off junctions 10, flowing from the inner duct 7, through deflecting chamber 12 as indicated by arrows in Figures 2, 3 and 5. This process of equalization to give an isostatic condition continues as long as air flows into any of the branches. The use of the pressure equalizing pipe or duct 7 approximates the presence of a reservoir at a remote point in the system, whence a constant supply of air at required head pressure may flow as needed through branches located far from the main air source. It will be noticed, upon reference to Figures 4 and 5, that ingress of air to a branch may be from both directions; from the side opposite the air source, as well as that nearest it.

Here appears another advantage of my invention; branches may lead off at a right angle to the line of the distribution system, without the interposition of so-called transitions or boots, or other deflecting devices to convey the air in an easy curve into its new path as is necessary with conventional unidirectional flow installations.

Heretofore, to receive the desired air delivery at each outlet of a distribution system, it has been necessary to reduce the size of the trunk after one or more branches have been taken off in the endeavor to equalize the head pressure. In my system, by the use of the equalizing duct 7, the pressure is inherently equalized throughout the entire length of the distribution system, and thus reduction in size, for the purpose of balancing pressures to gain desired air delivery at various points of outlet, is unnecessary. If it is desired, however, as a matter of economy or for other reasons, reductions in size of the distribution system may be made without detriment to the efficiency of the installation.

Since the pressure head in my isostatic system is constantly and inherently equalized throughout the length of a distribution system, it follows that delivery volumes will be constant and easily ascertained. A designer can estimate the required distribution system sizes for various capacities much more readily without the use of excessively large safety factors and troublesome calculations as has been necessary with conventional duct systems. The use of valves, vanes, transitions, increasers, reducers, etc., may be entirely eliminated.

The various units which enter into the construction are few in number, and can readily be so standardized that a relatively small number will be required to cover a wide range of installations, thus reducing manufacturing, warehousing, and installation costs.

Due to the small number and the simplicity of parts required, material costs will be reduced, space requirements lessened, installation and labor costs lowered.

For reasons of economy, compactness, and air flow advantages, I have placed the pressure equalizing pipe or duct 7 in the distributing pipe or duct 6. However, there are no reasons, aside from those stated, for such location, as the system will function as well if this equalizing pipe is located outside of pipe 6, parallel thereto.

Air from the room or enclosure, which may be called secondary air, flows through an intake opening 27 into the regulating device 16 where it is mixed with conditioned air from the branch 9 and then flows up the stack 13 and through the outlet head 14 into the room or enclosure. The means by which the secondary air is drawn through the intake opening 27 and the means for mixing the air in the control device 16 are described in my co-pending application heretofore mentioned, the detailed showing and description of which is hereby incorporated in this application by reference, the same as though directly incorporated therein.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A fluid distribution system consisting basically of two conductors one mounted within the other with a radial space therebetween, the inlet ends of which are connected to a common source of fluid supply, the opposite ends thereof being connected together to permit free interchange of fluid between the two conductors; the outer of said conductors forming a distributing chamber from which the flow of fluid is led through branch conductors connected thereto; the inner conductor being of a continuous construction and serving as a pressure equalizing conductor.

2. In a fluid distributing system communicating with a fluid source, means of obtaining inherently equalized pressure throughout the length of the distributing system, said means comprising the combination of a distributing duct with branch ducts and a pressure equalizing member of a continuous duct construction mounted within the distributing duct, one end of said distributing duct communicating with the fluid source and the other end of said distributing duct communicating with one end of the pressure equalizing member, said other end of the pressure equalizing member communicating with the fluid source.

THOMAS A. BAKER.